Figure 1:
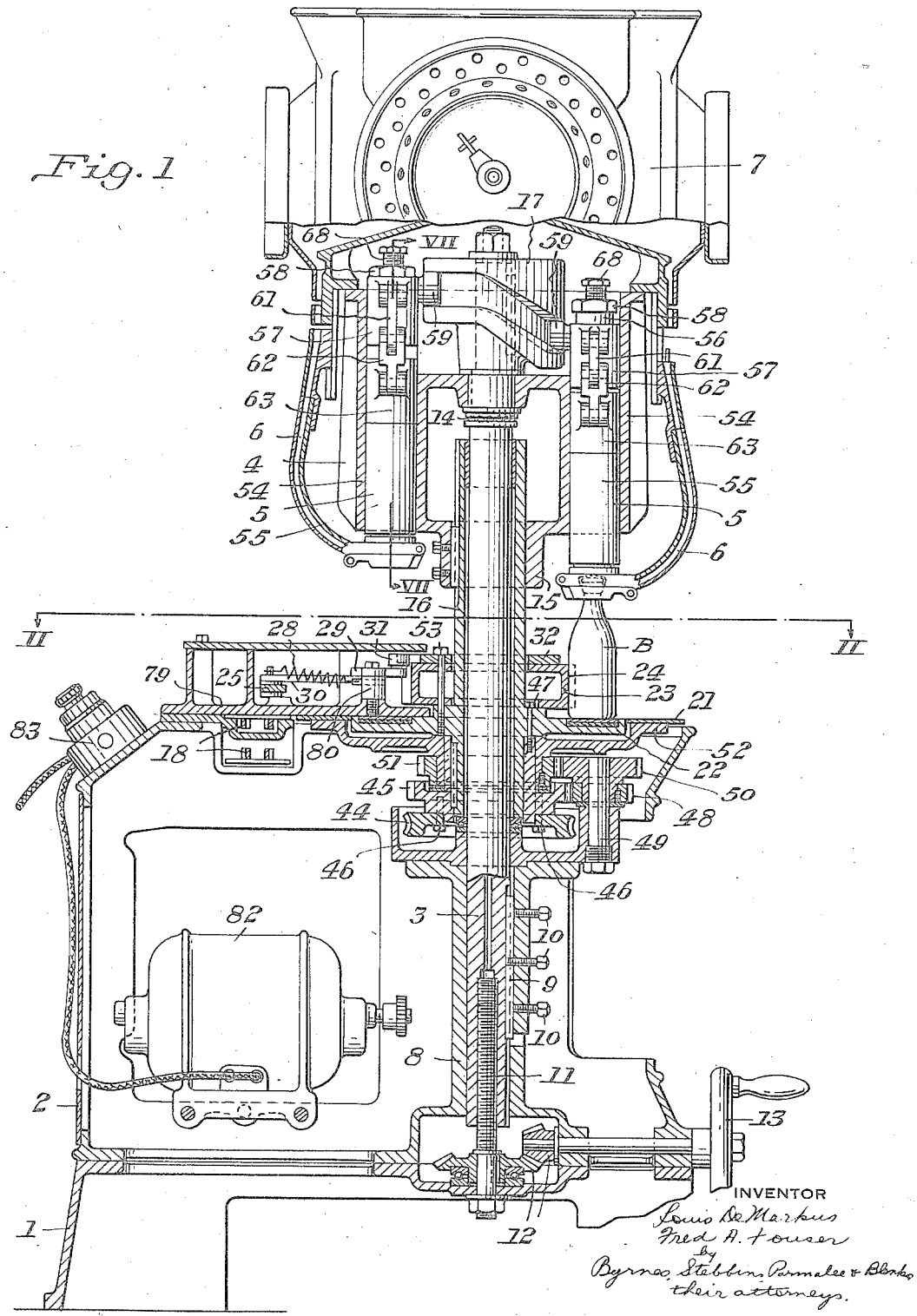

April 7, 1936.  L. DE MARKUS ET AL  2,036,796

CONTAINER HANDLING APPARATUS

Original Filed Feb. 4, 1929    4 Sheets-Sheet 1

INVENTOR
Louis De Markus
Fred A. Houser
by Byrnes, Stebbin, Parmelee & Blenko
their attorneys.

April 7, 1936.  L. DE MARKUS ET AL  2,036,796
CONTAINER HANDLING APPARATUS
Original Filed Feb. 4, 1929  4 Sheets-Sheet 3

INVENTOR
Louis De Markus
Fred A. Fouser
by Byrnes, Stebbins, Parmalee & Blenko
their attorneys.

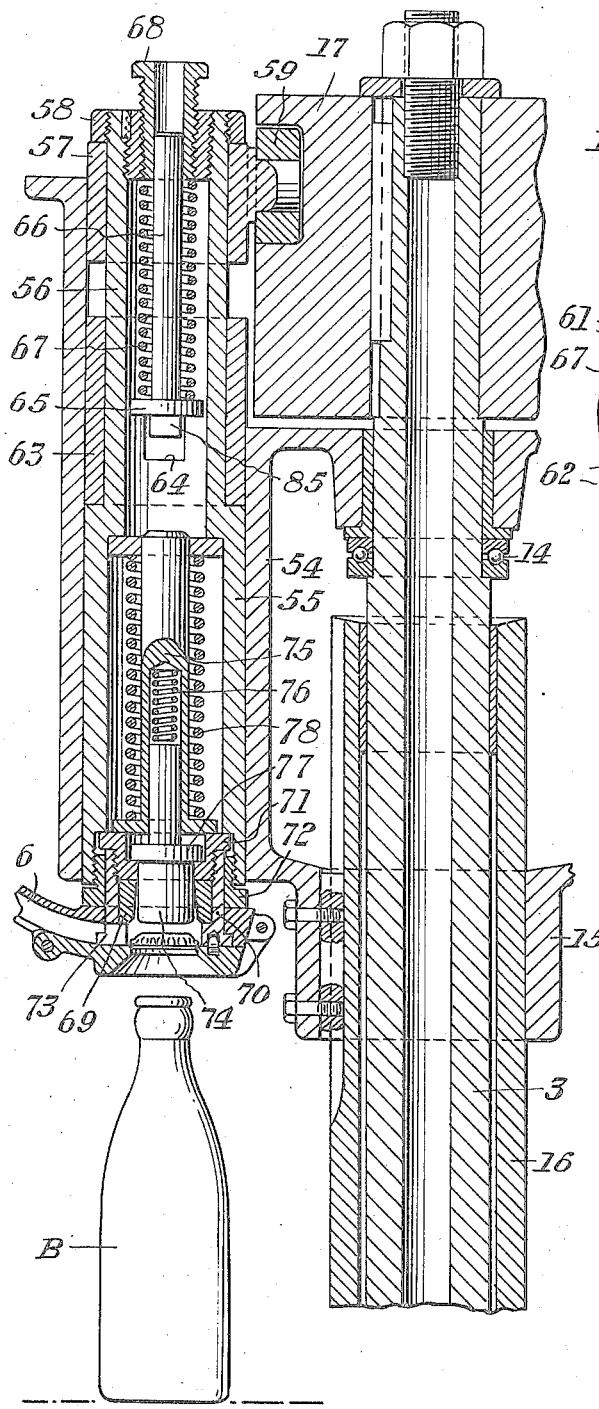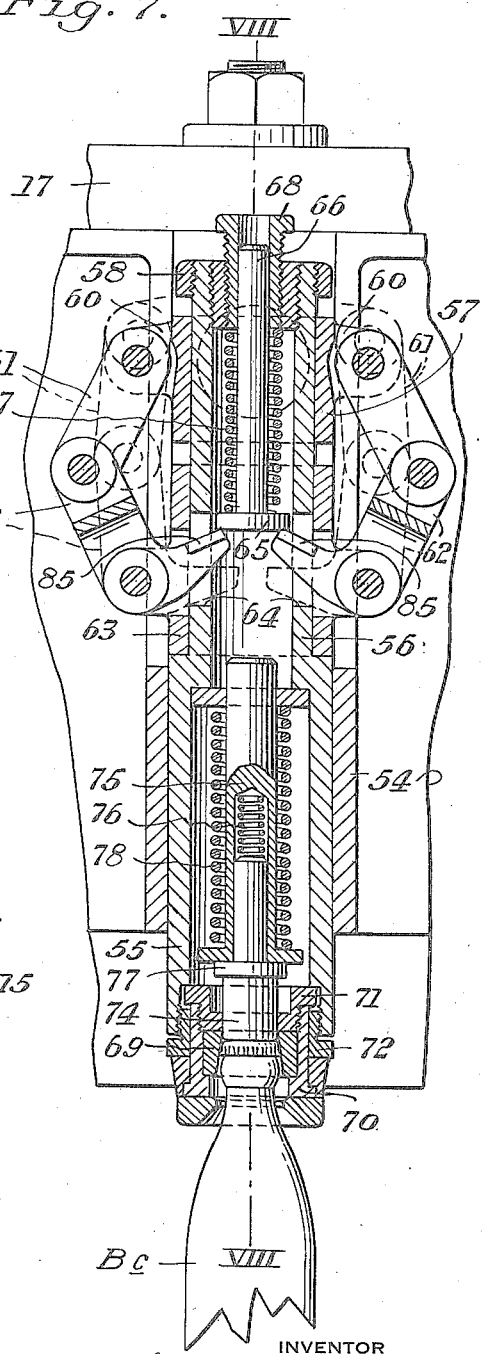

UNITED STATES PATENT OFFICE 2,036,796

CONTAINER HANDLING APPARATUS

Louis De Markus and Fred A. Fouser, Pittsburgh, Pa., assignors to McKenna Brass & Manufacturing Company, Pittsburgh, Pa., a corporation of Pennsylvania Original application February 4, 1929, Serial No. 337,241. Divided and this application August 12, 1931, Serial No. 556,470

12 Claims. (Cl. 226—84)

This invention relates to container handling apparatus, and is herein particularly described as a crowner for bottles, although certain features of the invention have other applications.

This application is a division of our copending application, Serial No. 337,241, filed February 4, 1929.

Many container handling devices such as crowners, syrupers and fillers are of the rotary type wherein the containers travel to a rotating support or table and are subjected to crowning syruping, filling or the like while so supported. Many feeding devices have been employed in connection with such rotary tables, but most of them are open to numerous objections. The proper centering of the container on the support is of importance. It is highly desirable that the transfer from the conveyors to the support be effected at high speed (so as to insure large capacity) and at the same time without danger of tipping.

We provide a supporting disk having a rim and means for rotating the disk and the rim at different angle velocities. In practice, the containers are fed from a conveyor across the rim to the disk and then after they have passed through the machine, they are fed from the disk across the rim to the takeoff conveyor. In practice, the rim is driven at higher speed than the disk, and this high speed rim cooperating with suitable guides quickly takes the containers to and from the disk without danger of choking and without danger of the containers tipping over.

The rim may be driven in any desired manner, but we prefer to connect it through gearing to the disk itself, so that driving of the disk effects the driving of the rim in the proper direction and at the desired proper relative speed.

The feeding means employed preferably includes a stop arranged to check the movement of the container as it is about to pass from the rim onto the disk. When it is desired to feed the container, the finger is retracted and the disk moving at relatively high speed quickly advances the container to its position on the disk.

Rotary container handling machines as heretofore constructed have been uni-directional. This has frequently been decidedly disadvantageous from the point of view of plan layout. We provide a machine which may be operated in either direction. The feed and take-off channels for the conveyor are arranged symmetrically relative to the center line of the machine and the feed means employed preferably lies between these channels.

The feed means is preferably arranged so as to be turned over, thus making it effective for operating on the channel to either side. The feed means is preferably driven from a cam on the container supporting disk, and this cam together with such container receiving pockets as may be provided on the disk, is also made reversible. With this arrangement it is a relatively simple matter to change the direction of the machine from clockwise to counter-clockwise, thus adapting it to the particular problem of plant layout which is encountered.

As above stated, the machine is herein particularly described as applied to crowning. The crowning heads are actuated by a cam and this cam is made symmetrical so that the operation of the heads is the same regardless of the direction in which the machine is run.

The machine heads are supported on an adjustable column or standard. This column may be moved up or down to accommodate the machine to different sized bottles. The standard is fixed against rotation and rotational movement is imparted to the head through a rotatable sleeve surrounding the standard. The head is preferably provided with a portion which embraces the sleeve and make a spline connection therewith. This arrangement insures rigidity and strong support for the head and at the same time provides a construction which gives adjustability with a minimum of parts.

In performing certain operations on containers as, for example, the applying of crowns to bottles, it is highly desirable that some accurate means be provided for limiting the applied pressure. Various schemes have been proposed, among them that of a spring backed toggle. In these spring toggle schemes, as exemplified by the patent to Mueller, No. 876,381, dated January 14, 1908, there is provided a toggle which "breaks" when a certain pressure is reached. The breaking of the toggle is opposed by a spring. The mechanical advantage of the toggle decreases as the angularity between the toggle links changes, but this is counteracted by the increasing power of the resisting spring, so that so long as the spring is still capable of further compression, the maximum force transmissible through the toggle is substantially constant regardless of the degree of deformation of the toggle.

However, the spring toggle arrangement as heretofore employed has been defective in that it has been used in a connecting rod for actuating a bottle supporting plunger. In such arrangement the angular relation of the center line of the toggle and the center line of the bottle is constantly changing. Since the effective force applied through the toggle is that component of the total force which is parallel to the direction of movement of the bottle, it will be seen that if resistance to movement of the bottle, as would be offered for example by a crowning die, takes place at different angular positions of the connecting rod, the maximum force actually applied to the bottle will vary. It further follows that this force must vary with bottles of different height in the arrangement such as above described and such as shown in the above recited patent.

In crowning it is important to closely regulate the maximum crowning pressure. The hardness of the crown metal varies, and some crowns can be applied with relatively low pressure while others require a higher pressure. If, however, too high a degree of pressure is employed, there is danger of breaking the crowning ring on the bottles. The ideal condition is when the crowns are applied "softly" without any sudden shocks. We provide means for imposing a substantially constant maximum force and maintaining such means in substantially constant angular relation with the container. In a crowning machine this is preferably carried out by providing means for causing relative movement between the bottle and the crowning die and movable in a direction parallel with the axis of the bottle, this means including a spring backed toggle. We further provide in a crowner means for centering the crown on the bottle before the crown is forced into the die. This insures accurate crowning of all bottles.

Figure 2:
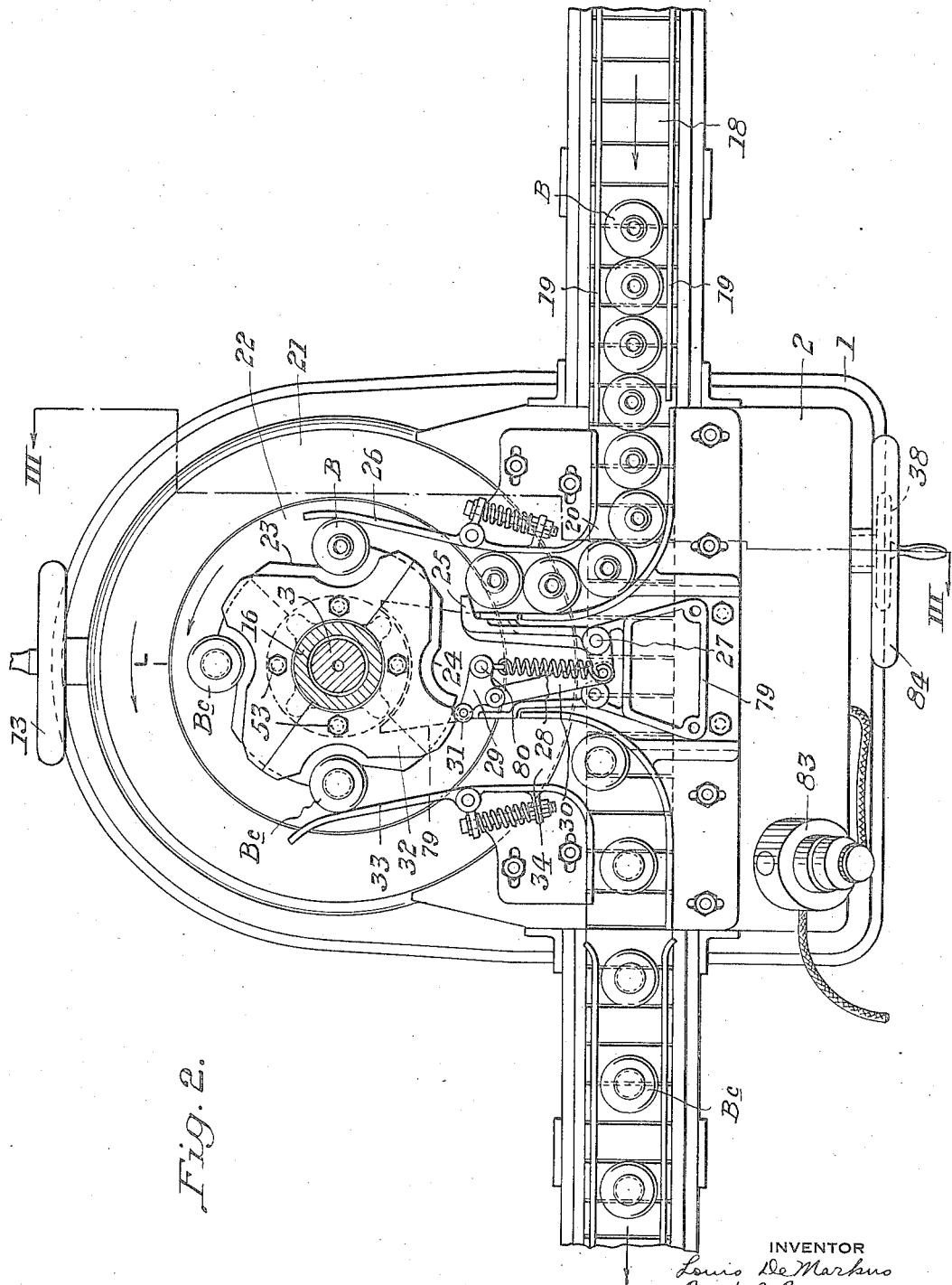
Figure 3:
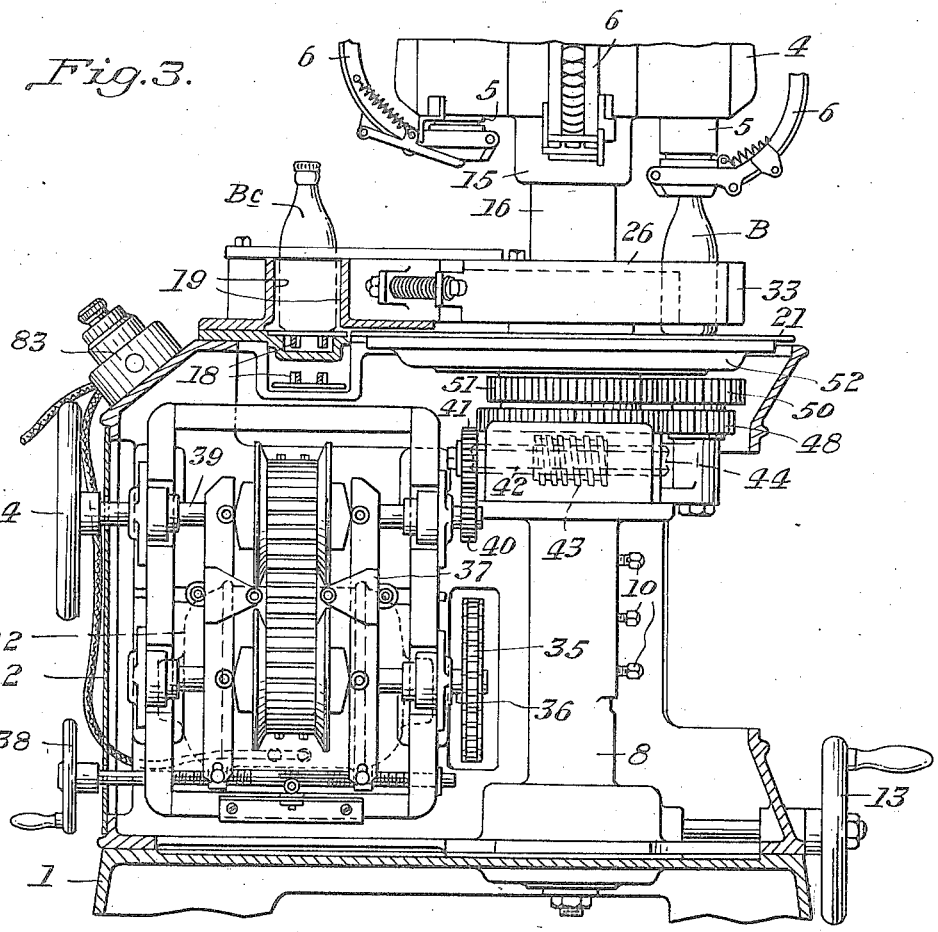
Figure 4:
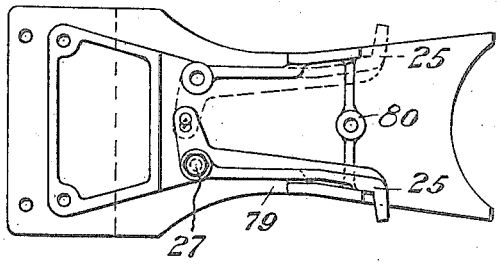
Figure 5:
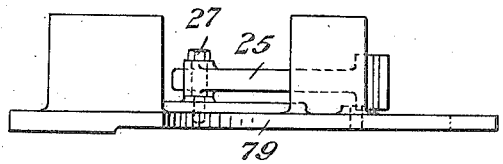
Figure 6:
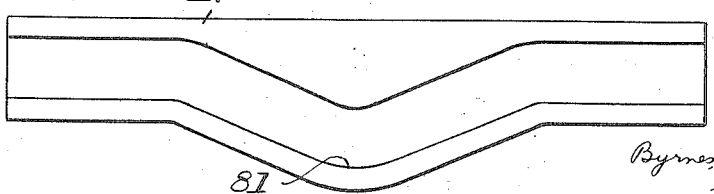

In the accompanying drawings illustrating the present preferred embodiment of the invention, Figure 1 is a side elevation of a crowner embodying the invention, partly broken away so as to show the supporting disk and rim therefor in section, Figure 2 is a horizontal section taken on the line II—II of Figure 1, Figure 3 is a vertical section through the lower part of the machine taken approximately on the line III—III of Figure 2 and showing the driving mechanism, Figure 4 is a top plan view to enlarged scale showing part of the feed mechanism, Figure 5 is a side elevation of the apparatus shown in Figure 4, Figure 6 is a developed view showing the cam for operating the crown plungers, Figure 7 is a vertical section to enlarged scale taken on the line VII—VII of Figure 1, showing the crowning plunger and the arrangement of the spring backed toggle, and Figure 8 is a section taken on the line VIII—VIII of Figure 7.

*General construction*

The machine illustrated in the drawings is a crowner comprising a base 1 supporting a casing 2 for the drive mechanism, from which casing a standard 3 (Figure 1) extends upwardly to support the rotating head 4 of the machine. The head carries four crowning plungers 5 each provided with a crown chute 6 supplied from a crown hopper 7.

The standard 3 is slidable vertically in a hollow post 8 formed in the casing 2, but is held against rotation by a key 9. Set screws 10 are provided so as to eliminate any shake from the standard 3 when it is in the desired adjusted vertical position.

The standard 3 is bored and threaded to receive an elevating screw 11. This screw is connected through bevel gearing 12 to a hand wheel 13. When the set screws 10 are loosened, the standard 3 may be raised or lowered by rotation of the hand wheel 13.

The weight of the head 4 is carried by a roller bearing 14 near the top of the standard 3. Adjacent its lower end the head is provided with a large hub 15 which makes a close but sliding fit on a sleeve 16 which surrounds the standard 3. Raising or lowering of the standard 3 is effective for raising or lowering the head 4. The sleeve 16 is fixed against vertical movement and the hub 15 slides on it. The head is driven by rotation of the sleeve 16.

At the top of the standard 3 and fixed against rotation there is provided a barrel cam 17 for actuating the crowning plungers 5.

*Bottle feed mechanism*

See particularly Figures 1, 2, 4, 5 and 6.

Bottles B are supplied by a conveyor consisting of a chain 18 and side guides 19. The bottles are guided into a channel or path 20 which takes them sidewise of the direction of travel of the conveying chain 18 and onto a ring or rim 21 surrounding a supporting disk 22. The rim 21 is driven at higher angular velocity than the disk 22.

The disk 22 is surmounted by a spider 23 having bottle receiving pockets 24 for positioning the bottles below the crowning plungers 5.

The bottles are advanced in the path 20 until the leading bottle is engaged by a check finger 25. This finger is periodically retracted so as to permit the leading bottle to advance in the path and move into one of the pockets 24. It will be noted that the leading bottle is checked just as it is about to pass from the rim 21 to the feed disk 22. When the finger 25 is retracted, the leading bottle is moved rapidly onto the disk 22 but without danger of tipping and is guided into the pocket by a spring pressed finger 26.

The finger 25 rocks on a fixed pin 27 and is normally urged to the position shown in Figure 2 by a spring 28. Retraction is effected by a rocking lever 29 connected to the finger 25 through a link 30. The lever 29 carries a cam follower 31 which is engaged by a cam 32 surmounting the spider 23. Rotation of the spider is therefore effective for retracting the finger 25 every time a bottle receiving pocket 24 passes the feed mechanism.

As shown in Figure 2, the machine is rotating in a counter-clockwise direction and crowning takes place while the bottles are supported on the disk 22. The crowned bottles Bc in the latter part of their travel on the disk 22 are engaged by a spring pressed finger 33 which prevents their tipping over after they have been freed from the crowning plungers 5. Continued rotation of the disk 22 brings the crowned bottles successively between the side guides forming a path or channel 34.

The side guides of the channel 34 extend over the disk 22 and cause the crowned bottles to move from the disk onto the rim 21. Because of the fact that the rim is moved at higher angular velocity than the disk 22, it carries the bottle away rapidly. This is also an advantage in feeding since it moves the bottles rapidly into the pockets 24, thereby eliminating tipping and preventing choking of the machine.

It will be understood that the feed mechanism lies between the channels 20 and 34 and that such channels are symmetrically arranged. As hereinafter described, the feed mechanism, as well as the spider 23 and the cam 32, are made reversible so that the direction of rotation of the machine can be changed.

Drive mechanism

See particularly Figures 1 and 3.

The machine is driven by a motor 82 contained in the casing 2 and controlled by a switch 83. The motor is connected through a silent chain drive 35 to the driven shaft 36 of a variable speed transmission indicated generally by the reference character 37. This transmission is of the well known Reeves type and is provided with an adjusting wheel 38 lying outside the casing 2 whereby the transmission may be adjusted and the speed of the machine thereby changed.

A driven shaft 39 of the transmission extends outside the casing 2 to receive a hand wheel 84, whereby the machine may be turned by hand for purposes of adjustment, setting up and the like.

The driven shaft 39 of the transmission also carries a pinion 40 meshing with a gear 41 on a worm shaft 42. A worm 43 on the shaft 42 meshes with a worm wheel 44 connected to a gear 45 by bolts 46 (Figure 1). The gear 45 in turn is connected to the sleeve 16 and the disk 22 by bolts 47. Rotation of the worm wheel 44 is therefore effective for driving the sleeve 16 and the disk 22 which is formed integral therewith.

The gear 45 drives a pinion 48 carried by a stub-shaft 49. A pinion 50 is connected to the pinion 48 and rotates therewith. It meshes with a gear 51 connected to a spider 52 which carries the rim 21. The pinion 50 is larger than the pinion 48 and the gear 51 is smaller than the gear 45 and the rim 21 is therefore driven at a higher angular velocity than the supporting disk 22.

As shown in Figure 1, the cam 32 and the spider 23 are secured to the disk 22 by bolts 53 so as to be positively rotated therewith.

The conveyor chain 18 is driven from separate mechanism, not shown.

Crowning plunger

See particularly Figures 1, 7 and 8.

Each crowning plunger 5 is guided in a shell 54 forming part of the head 4. The plunger comprises a body 55 having an upper reduced portion 56 carrying a slidable ring 57. The outward movement of this ring is limited by a check nut 58.

The ring carries a follower 59 lying in the groove of the barrel cam 17. It carries ears 60 in which are pivotally mounted links 61 forming a part of a toggle mechanism. The cooperating links 62 of the toggle are formed as bell crank levers and they are pivoted in a ring 63 lying at the lower end of the reduced portion 56 of the plunger body 55. The horizontally extending arms 85 of the links 62 project through openings 64 into the interior of the plunger body 55 and are there engaged by the enlarged head 65 of a sliding rod 66. This rod is surrounded by a compression spring 67 backed by an adjusting nut 68. The toggle normally occupies the dotted line position of Figure 7, and it will be noted that in this position the arms 61 and 62 of the toggle lie at a slight angle to one another so that the toggle may "break" when downward pressure is applied to the ring 57. The movement of the toggle links in one direction is limited by the arms 85 coming into engagement with the bottoms of the openings 64 so that the toggle always tends to return to the dotted line position of Figure 7. It is apparent that a line drawn through the center of the joint about which the upper end of link 61 rotates and the center of the joint at the lower end of link 62 and about which it rotates will always be in fixed angular relationship with the center line of the crowning plunger. The line thus drawn through said joints will be hereinafter designated as "the axis of the toggle".

As the head rotates, the followers 59 moving in the groove of the barrel cam 17 are forced downwardly and the plungers move therewith. However, when the movement of a plunger is checked, as by engagement with a bottle, the toggle breaks, the links thereof swinging outwardly, and the arms or extensions 85 thereof swinging upwardly and compressing the spring 67.

The more nearly the toggle arms 61 and 62 lie in a straight line, the less is the mechanical advantage of the toggle. However, the greater the departure of the arms 61 and 62 from a straight line, the greater is the compression on the spring 67, so that the increasing power of the spring offsets the decreased mechanical advantage of the toggle. Because of this arrangement there is transmitted through the toggle to the ring 63 a substantially constant maximum force.

Assume that a high bottle is being crowned. Under these circumstances the plunger 5 might reach its bottom position when the cam follower was still 3/4" above its lowermost position as determined by the grooves in the barrel cam 17. Under these circumstances the ring 57 would slide downwardly on the body 55 and would actuate the toggle mechanism. However, this excess of movement of the follower 59 imparts no additional pressure to the body 55, that pressure remaining substantially constant until the toggle returns to its normal position.

If a low bottle is to be crowned, the excess of movement of the follower 59 may be only 1/4" instead of 3/4" as in the case of a high bottle, but the same maximum crowning pressure is nevertheless applied.

The degree of crowning pressure can be regulated by adjusting the nut 68 and thereby changing the initial compression on the spring 67.

It will be noted that the toggle is always maintained coaxial with the bottle. This is a great advantage as compared with structures wherein a spring pressed toggle is incorporated in a connecting rod on a crank for raising bottles into engagement with a crowning die. The angle which the connecting rod makes with the line of travel of the bottle at the moment that the bottle engages the crowning die varies with the bottle height in such structures. Therefore, the component of force applied through the connecting rod along the line of axis of the bottle and the spring toggle mechanism does not achieve the desired result of effecting substantially uniform crowning pressure regardless of the bottle height.

In the lower end of the body 55 of the crowning plunger, there is provided a crowning die 69 carried in a holder 70. The holder is screwed to a ring 71 which is held in the lower end of the body 55 by a threaded ring 72.

The holder 70 is slotted, as indicated at 73 in Figure 8, to cooperate with the lower end of the crown chute 6. In Figure 8 there is shown a crown in position to be crimped onto a bottle B. As the crowning plunger moves down on the bottle, the crown is first picked up by the locking ring of the bottle. A centering head 74 lies immediately above the crown. This head is slidable in a shell 75 and is backed by a light spring 76. It is effective for supplying a light pressure on the crown and making certain that the same will be centered on the bottle.

The head 74 is shouldered, as indicated at 77, to limit its outward movement and also to engage the bottom of the shell 75 when the head 74 moves upwardly. The shell 75 is slidable in the head and its upward movement is resisted by a strong coil spring 78. On continued downward movement of the plunger, the crown is moved into the crowning die 69, but upon this movement the shell 75 moves upwardly and the spring 78 is compressed. When the crowning plunger 5 is again moved upwardly, the spring 78 acts through the shell 75 and the head 74 for ejecting the crowned bottle from the crowning die 69.

We have described the action of the toggle mechanism in crowning, and have shown that it provides a substantially constant maximum crowning pressure regardless of the bottle height. It will be understood that the same problems may be present even though bottles of absolutely unvarying height are being crowned, because of the fact that the crowns themselves vary. In some cases the crown may be engaged by only the lower portion of the crowning die. In other cases the crown may move a considerable distance into the die. The toggle mechanism automatically compensates for all of these varying conditions and insures that the crowning pressure determined by the adjustment of the nut 68 will always be applied.

Reversibility of machine

As above pointed out, the paths 29 and 34 whereby the bottles may be taken to and from the machine are substantially symmetrical and the feed mechanism is placed between these paths. The feed mechanism is shown in more detail in Figures 4 and 5 from which it will be seen that the finger 25 is carried by a base plate 79. This base plate is symmetrically arranged so that if it is desired to reverse the direction of the machine, the finger 25 may be moved from the solid line position of Figure 6 to the dotted line position thereof. The rocking lever 29 is mounted on a pin 80 located on the center line of the base 79 and the moving parts of the feed mechanism may therefore be turned upside down so that the finger 25 works in the channel 34 instead of in the channel 29. The position of the fingers 26 and 33 may be reversed.

As best shown in Figure 2, the spider 23 and the cam 32 are each made in two parts and may be used either side up. When the bolts 53 are removed, the spider and cam can be turned upside down and again secured by the bolts 53.

Figure 6 shows a development of the barrel cam 17. It will be noted that it is symmetrical. The low point 81 of the cam is positioned on the radial line L of Figure 2 so that the movement of the crowning plungers is the same regardless of the direction in which the machine is driven.

There are many cases where it is desired to have the machine run clockwise instead of counter-clockwise. With the arrangement above provided, the machine can be readily adapted in a few minutes to run in either direction, as desired.

We have illustrated and described the present preferred embodiment of the invention. It will be understood, however, that it is not limited to the form shown but may be otherwise embodied within the scope of the following claims:

We claim:

1. Container handling apparatus comprising a container support, a head adapted to perform an operation on the container, a plunger for causing relative movement between the container support and the head, the plunger having relatively axially movable portions, a spring backed toggle connecting such portions, and plunger actuating means connected to one of said portions.

2. Container handling apparatus comprising a container support, a head adapted to perform an operation on the container, a plunger for causing relative movement between the container support and the head, the plunger having relatively axially movable portions, a spring backed toggle connecting such portions, and plunger actuating means connected to one of said portions, the plunger being hollow and the toggle spring being contained within the hollow plunger.

3. A crowning head for machines for affixing crown stoppers to bottles, comprising a head having a cam formed thereon, a shell forming part of the head, a hollow plunger in said shell having an upper reduced portion carrying a slidable ring which ring has a portion engaging with said cam, and a second slidable ring on said reduced portion, said rings being connected by a toggle.

4. A crowning head for machines for affixing crown stoppers to bottles, comprising a head having a cam formed thereon, a shell forming part of the head, a hollow plunger in said shell having an upper reduced portion carrying a slidable ring which ring has a portion engaging with said cam, a sliding rod with an enlarged head within said plunger, and a second slidable ring on said reduced portion, said rings being connected by a toggle, one of the links of said toggle being formed as a bell crank lever and pivoted to the second slidable ring, said bell crank lever having a horizontally extending arm projecting through openings in said second ring and engaging the enlarged head of said sliding rod.

5. A crowning head for machines for affixing crown stoppers to bottles, comprising a head having a cam formed thereon, a shell forming part of the head, a hollow plunger in said shell having an upper reduced portion carrying a slidable ring which ring has a portion engaging with said cam, a sliding rod with an enlarged head in said plunger, a spring axially arranged around said rod and between it and the end of the plunger so as to permit axial movement of the rod with respect to the plunger, and a second slidable ring on said reduced portion, said rings being connected by a toggle, one of the links of said toggle being formed as a bell crank lever and pivoted to the second slidable ring, said bell crank lever having a horizontally extending arm projecting through openings in said second ring and engaging the enlarged head of said sliding rod.

6. Container handling apparatus comprising a container support, a head adapted to perform an operation on a container, a plunger in said head, drive means, and means for causing the plunger to move in the head relative to the container support, said means including a toggle and a spring, whereby a substantially constant maximum force may be exerted between the container support and the head, the toggle being movable with the plunger.

7. A crowner comprising a bottle support, a crowning die, drive means, and a connection for causing relative movement between the bottle support and the crowning die, said connection including a toggle having arms of fixed length arranged to impose a substantially constant maximum crowning force, the axis of the toggle being in substantially constant parallelism with the bottle throughout the crowning operation.

8. A crowner comprising a bottle support, movable in a horizontal plane at a fixed elevation, a crowning die, drive means, and a connection for causing the crowning die to move away from and toward the bottle support, said connection including a spring backed toggle, having arms of fixed length, the axis of the toggle being in substantially constant angular relationship with the bottle throughout the crowning operation.

9. A crowning head formed in two parts for machines for fixing crown stoppers to bottles, the outer shell being hollow and forming part of a vertically sliding head, a hollow inner plunger, a spring mounted internally of the inner plunger, and a toggle cooperating with said spring, said inner plunger being slidable vertically in the outer shell against the action of said toggle and said spring.

10. Container handling apparatus, comprising a container support movable in a horizontal plane at a fixed elevation, a head adapted to perform an operation on a container on said support, a plunger in said head, drive means, and a connection for causing the plunger to move toward and away from the container support, said connection including a spring backed toggle, having arms of fixed length, the axis of the toggle being maintained in constant angular relationship with the container throughout the operation.

11. A crowning head for affixing crown stoppers to bottles, comprising a shell, a crowning plunger therein, said plunger comprising a body having a lower portion and an upper reduced portion, a sliding rod cooperating with said plunger, a spring between said plunger and said sliding rod, two spaced apart slidable rings on said reduced portion, one of said rings bearing against the upper end of the lower portion of the body, a toggle connecting said rings, said toggle having an extended arm engaging the sliding rod, and means for moving one of said rings with respect to the shell.

12. A crowner comprising a bottle support, a crowning die, drive means, and a connection for causing the crowning die to move relative to the bottle support, said connection including a toggle, a spring cooperating with the toggle, whereby a substantially maximum crowning force may be exerted, the longitudinal axis of said spring being substantially coaxial with the center line of the bottle throughout the crowning operation.

LOUIS DE MARKUS.
FRED A. FOUSER.